H. R. HIRST.
TOOL FOR INSERTING PLUGS IN TIRES.
APPLICATION FILED MAR. 20, 1919.
1,348,005.
Patented July 27, 1920.
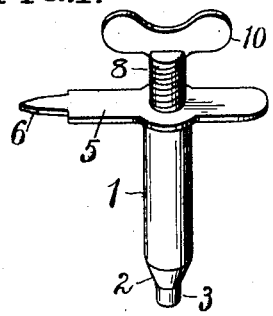
FIG.1.
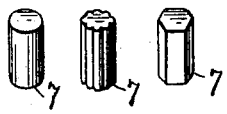
FIG.2.
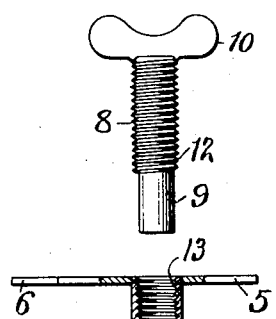
FIG.3.
FIG.4.
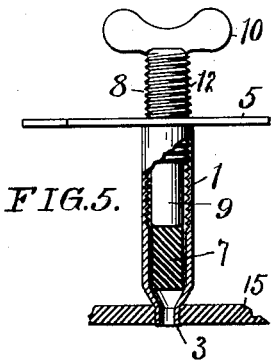
FIG.5.
FIG.6.
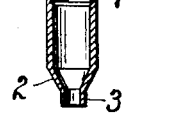
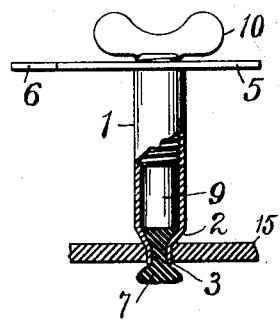
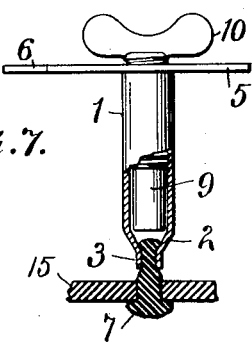
FIG.7.
FIG.8.
Inventor
Harry R. Hirst
F. DeWitt Goodwin
Attorneys

UNITED STATES PATENT OFFICE.

HARRY R. HIRST, OF TRENTON, NEW JERSEY.

TOOL FOR INSERTING PLUGS IN TIRES.

1,348,005.     Specification of Letters Patent.     Patented July 27, 1920.

Application filed March 20, 1919. Serial No. 283,870.

*To all whom it may concern:*

Be it known that I, HARRY R. HIRST, a citizen of the United States, residing at Trenton, in the county of Mercer and State of New Jersey, have invented certain new and useful Improvements in Tools for Inserting Plugs in Tires, of which the following is a specification.

My invention relates to the method and a tool for inserting elastic plugs in tires, particularly adapted for repairing punctures in single tube pneumatic tires for bicycles.

The object of my invention is to provide means whereby a plug of resilient material, such as rubber, may be compressed to a diameter relatively smaller than its normal diameter and by providing a tool having a contracted discharge pipe, which latter may be inserted into the aperture in the tire to be repaired and by means of a plunger in the tool force the plug partly out of the said discharge pipe, which will permit the free end of the plug to expand and form a head on the inside of the tire, which head will hold the plug in the tire with sufficient pressure to permit the discharge pipe of the tool to be withdrawn from the tire and at the same time pull the remaining portion of the plug from the tool, which said portion of the plug expands and forms a head on the outside of the tire; a still further object of my invention is to provide the tool with suitable handles for conveniently operating the tool.

And a still further object of my invention is to provide a cutter upon the handle of the tool for enlarging the aperture in the tire sufficiently to receive the discharge pipe of the tool.

Referring to the accompanying drawings; Figure 1, is a perspective view of the tool; Fig. 2, illustrates different forms of plugs which may be used in carrying out my invention; Fig. 3, is a side view of the plunger forming part of the tool; Fig. 4, is a vertical section of the tube adapted to receive the plunger, shown in Fig. 3; Fig. 5, is a side elevation partly in section showing the tool inserted in a tire and a plug in the tool; Fig. 6, is a view similar to Fig. 5, showing the plunger compressing the plug; Fig. 7, is a similar view showing the tool being removed from the tire and Fig. 8, is a sectional view of the plug shown inserted in a tire.

In the accompanying drawings in which like reference characters refer to like parts, 1 represents a tube provided with a conical portion 2 terminating in a discharge pipe 3. A cross-bar 5 is secured to the opposite end of the tube and forms a handle which is provided at one end thereof with a tapering point 6 for cleaning out and enlarging the aperture in the tire, which is to receive the plug 7.

The plunger 8, shown detached in Fig. 3, consists of an end portion 9 adapted to force a plug 7 into the contracted portion of the tube 1, and a handle 10 for operating the plunger. The plunger 8 and the tube 1 may be of any shape in cross-section, but I prefer to make them cylindrical so that screw-threaded portions 12 and 13 may be formed on the plunger 8 and the tube 1 respectively, so that the plunger may be screwed into the tube and thus compress the plug 7 from its expanded form, shown in Fig. 5, into the compressed form shown in Fig. 6.

The operation of my invention is as follows: The plug 7 is placed inside of the tube 1, the plunger is inserted in the tube and the discharge pipe 3 is inserted into the aperture formed in the tire 15. The plunger is then forced into the tube to compress the plug and force it partly through the discharge pipe 3 and thus allow the inner end of the plug to expand and form a head on the inside surface of the tire. The discharge pipe 3 is then withdrawn from the tire and from the plug, as shown in Fig. 7. The head formed upon the inside of the tire will prevent the plug from being pulled out and when the tool is entirely free from the plug, the latter will expand and form another head on the outside surface of the tire, thus forming a very effective method of repairing a tire.

Having thus described my invention I claim and desire to secure by Letters Patent;

1. A tool for inserting plugs in tires comprising, a tube having a body portion of the same interior diameter as the cross-section of the body portion of a resilient plug adapted to be inserted therein, a reduced end portion formed upon the end of the tube and a plunger mounted within the tube adapted to force the plug into the said reduced end portion and compress the body of the plug to a smaller diameter and eject a portion of the plug from the end of the tool.

2. A tool for inserting plugs in tires comprising, a tube having a body portion of the same interior diameter as the cross-section of the body portion of a resilient plug adapted to be inserted therein, a reduced end portion formed upon the end of the tube adapted to be inserted into the aperture in the tire to be repaired, a plunger in the body portion of the tube having a screw-thread formed thereon, a screw-threaded portion formed in the body of the tube to receive the plunger and handles formed upon the tube and upon the plunger whereby the plunger may be screwed into the tube to force the plug into the said reduced end portion of the tube and compress the body of the plug to a smaller diameter and eject a portion of the plug from the end of the tool.

In testimony whereof I affix my signature in the presence of two witnesses.

HARRY R. HIRST.

Witnesses:
GARRET W. SCHANCK,
WILLIAM SHREVE.